United States Patent [19]

Cangiane

[11] Patent Number: 5,329,473
[45] Date of Patent: Jul. 12, 1994

[54] FAST WINDOW/PRESUM OPERATION
[76] Inventor: Peter Cangiane, 626 Hermosa Ave. #B, Hermosa Beach, Calif. 90254
[21] Appl. No.: 761,088
[22] Filed: Sep. 17, 1991
[51] Int. Cl.[5] .......................................... G06F 15/332
[52] U.S. Cl. ...................................................... 364/726
[58] Field of Search ................ 364/725, 726, 724.01, 364/724.12; 128/661.09

[56] References Cited
U.S. PATENT DOCUMENTS

| 4,809,208 | 2/1989 | Hansen et al. | 364/724.12 |
| 4,862,402 | 8/1989 | Shah et al. | 364/724.12 |
| 5,107,841 | 4/1992 | Sturgill | 128/661.09 |
| 5,126,962 | 6/1992 | Chiang | 364/725 |

*Primary Examiner*—Long T. Nguyen

[57] ABSTRACT

An architecture and method for performing the known windowing and presumming operations associated with enhancing the performance of a fast Fourier transform (FFT) processor is disclosed. The method makes use of a reordering process in order to enable the multiplying and accumulating processes associated with the windowing and presumming operations to be performed on consecutive data points. In order to apply the appropriate coefficients to the multiplier, coefficients are loaded into a series of registers in a loop configuration in which the coefficient in one register is transferred to an adjacent register upon every clock cycle and the last coefficient register transfers its coefficient to the first register. An accumulator accumulates output from the multiplier and applies it to a delay register. The procedure of accumulating consecutive data points enables a delay register to be used in place of the prior art delay memories, thus enabling specialized chips to be effectively implemented without any random access memory (RAM). Consequently, efficient utilization of specialized integrated chips and memories is attainable.

22 Claims, 7 Drawing Sheets

FAST WINDOW/PRESUM OPERATION

BACKGROUND OF THE INVENTION

1. Field of the Invention

This invention relates generally to a window/presum operation architecture for a digital signal processor, and more particularly, to a window/presum operation architecture for a digital signal processor incorporating an efficient use of ASIC and memory chips.

2. Discussion of the Related Art

In certain processor applications, it is necessary to convert time domain data signals to frequency domain data signals. To perform such a transformation, Fast Fourier Transform (FFT) processors are most commonly used. Often, as is well known, the FFT processor performance can be enhanced by performing certain operations prior to the FFT itself. Two such operations, which are generally referred to as windowing and presumming, are very common. The windowing operation refers to a multiplication process which tailors a data block in an appropriate manner to be processed by the FFT. The presumming operation refers to an accumulation process which has the effect of reducing the size of the required FFT.

The prior art window and presum operation architectures have been implemented on high density application specific integrated circuits (ASICs) and separate memory chips. An ASIC enables a plurality of specialized functions to be performed on a single chip, as is well known in the art. Despite their success, these conventional window/presum architectures suffer from a number of drawbacks making them inefficient. Specifically, the conventional window/presum architectures require the existence of many blocks of memory imbedded within or between adjacent processing elements: this makes the number of chips required higher than need be (explained below), thus decreasing the reliability and increasing the size, weight, power and cost of the processor. In the conventional architectures, many banks of memory have been either implemented internally on the individual ASICs or externally in separate memory chips. These blocks of memory are required in the window/presum operations in order to delay data or delay window coefficients.

A number of problems arise if memory banks are included on the individual ASICs. First, the required depth of each memory block in the conventional architecture is application dependent. Consequently, the on-chip implementation lacks flexibility in that once the ASIC is built, the memory size and configuration is fixed and thus requires a new ASIC to achieve different memory capabilities for different applications. Secondly, ASICs cannot implement random access memory (RAM) very efficiently. Therefore, the on-chip method squanders ASIC resources on functions that would be better handled on specialized memory chips.

It is therefore known to remove the memory banks from the individual ASICs, and incorporate the memory on specialized memory chips. Typically, however, RAM chip Input/Output (I/O) limitations will preclude the consolidation of several of the separate RAM banks into a single memory chip. As a result, in many applications only a fraction of the storage capacity of each RAM chip will be utilized. This is a great reduction in the efficiency of the system in that a high memory chip count is required even though very dense memory chips are available in today's technology. In addition to an inefficient RAM utilization, conventional off-chip architectures also result in inefficient ASIC utilization. Although, very high capacity ASICs are available in today's market, with the off-chip memory method, ASIC I/O requirements become the limiting factor in determining how much of the window/presum architecture can be implemented in a single ASIC because each of the external RAM chips requires its own I/O ports to and from the ASIC. Consequently, conventional window/presum architectures cannot capitalize on the very high density ASIC and RAM chips which are currently available.

What is needed then is a window/presum operation architecture incorporating a reduced number of memory chips and ASICs such that the size, weight, power and cost of the processor is reduced, and the integrity and reliability of the system is increased. It is therefore an object of the present invention to provide such an architecture.

SUMMARY OF THE INVENTION

Disclosed is a fast window/presum (FWP) operation architecture which overcomes the implementation problems associated with the conventional window/presum architecture discussed above. Generally, the fast window/presum is achieved by a data reordering prior to performing the desirable arithmetic operations associated with the windowing and presumming operations. This reordering technique is a well known block operation generally referred to as corner turning. The resultant architecture is a simpler and more efficient window/presum architecture by making a more efficient use of available ASIC and memory technology.

More particularly, the fast window/presum architecture, according to one preferred embodiment of the present invention, contains imbedded delay registers in the ASIC chips instead of the imbedded delay memories of the prior art. The reordering of data makes it necessary for the specialized operations on the ASICs to select data from either a memory storing "current data" or "next data". This operation requires a delay memory between the reordering buffer and the arithmetic processors included on the specialized ASICs. Consequently, there are two data inputs to each ASIC: one from a reordering buffer and one from a delay buffer. Accordingly, the resulting fast window/presum architecture is separated into two memory intensive buffers and separate computation intensive processor chips. Therefore, the fast window/presum architecture has efficient hardware realization which takes maximum advantage of available ASIC and memory technologies. In addition, the FWP architecture is very flexible and can be improved as the ASIC and memory technologies improve.

Additional objects, advantages, and features of the present invention will become apparent from the following description and appended claims taken in conjunction with the accompanying drawings.

DETAILED DESCRIPTION OF THE PREFERRED EMBODIMENTS

The following description of the preferred embodiments is merely exemplary in nature and is in no way intended to limit the invention or its applications or uses.

As discussed above, the operations of windowing and presumming are known in the art to enhance the performance of FFT processors which convert time domain signals to frequency domain signals. Generally, the operation of windowing separates a stream of digital data signals into a sample block of data of specific length and multiplies each individual digital data point by a predetermined coefficient to establish a data sample applicable to be processed for a specific application. The operation of presumming reduces the size of the required FFT processor by summing together selective points of the sample block of data after the windowing operation. The combination of these two operations are performed on a stream of digital data prior to being admitted to the FFT processor.

Figure 1:
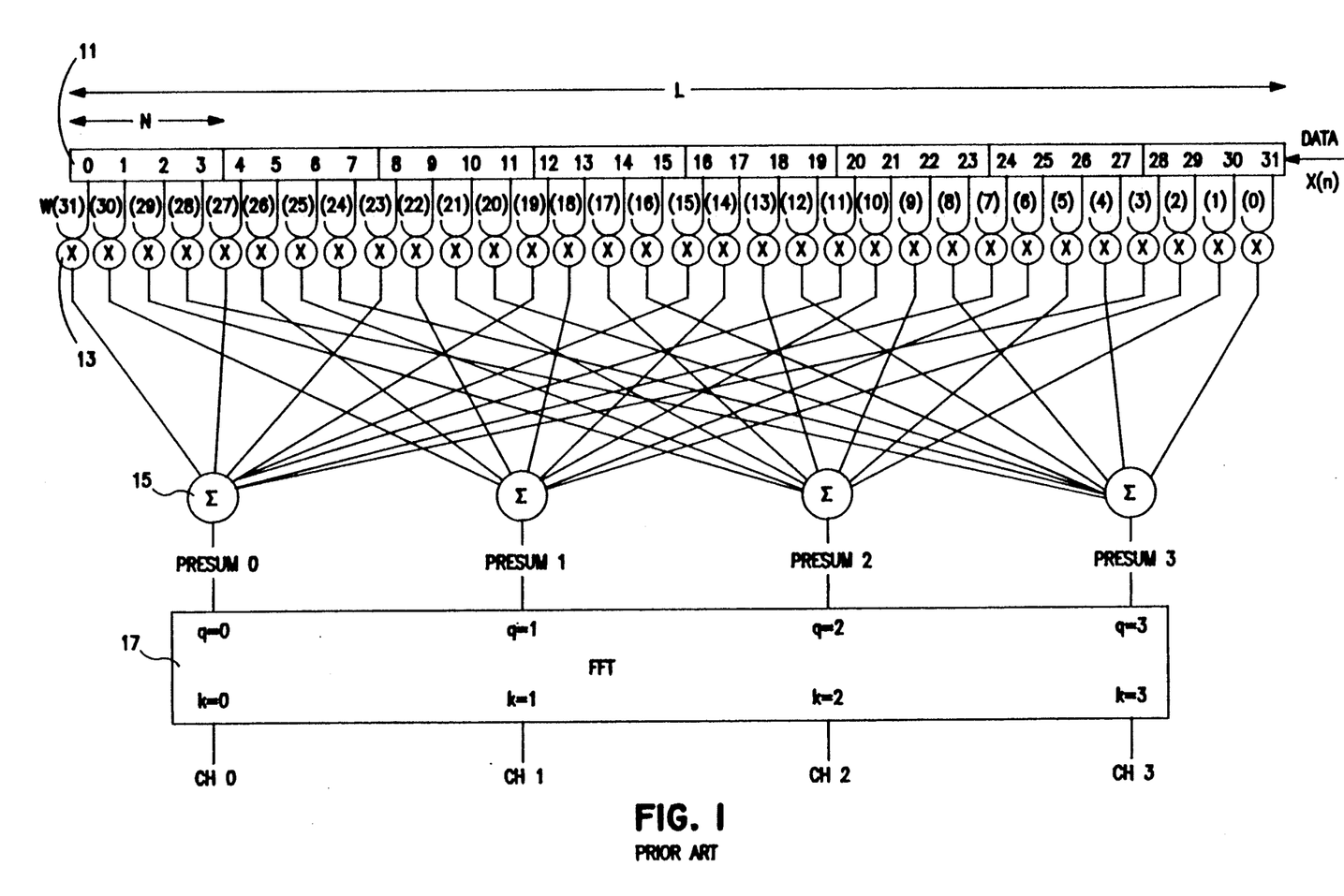
FIG. 1 is a block diagram of the basic operation of windowing and presumming.

FIG. 1 represents in a block diagram form the windowing and presumming operations being performed on a stream of digital data bits X(n). Note that this figure is a conceptual illustration and does not represent an efficient hardware implementation. Furthermore, the N-input N-output FFT in the figure is an ideal device. In practice, FFT processors have I/O limitations and, thus, typically have a single serial input port and a single serial output port. In this example, the data stream is admitted from the right side into a shift register 11 shown at the top of the diagram. As each digital data point is introduced into the first right position, the data point which was in that position is shifted to the next adjacent left position and so on. Here the length of the shift register is 32, which is defined as the length of a window L representing a block of data. Each consecutive four data samples is separated as a group N. Four (4) is selected as the value N because this is the number of input and output channels an FFT signal processor 17 has as will be discussed below. For the process in this example, a group of four data points will be shifted into register 11 prior to recomputing a new set of outputs as will be discussed below.

Once shift register 11 is full of data samples the windowing process can be performed. To accomplish this each individual data point is multiplied in a series of multipliers 13 times a specific coefficient. The coefficient is determined depending on the application desired, and are labeled W(0)-W(31). As is apparent, there is a multiplier 13 and a coefficient input for each individual data point in shift register 11.

The outputs of the multipliers 13 are applied to summing junctions or adders 15 which represent the presumming operation. Since there are N=4 channels of the FFT, there are N number of adders 15 because the presumming operation adds together the same positional data point within each set of N values of a window length, as shown. In other words, the 0th, 4th, 8th, 12th, 16th, 20th, 24th and 28th data points are added together in one adder 15; the 1st, 5th, 9th, 13th, 17th, 21st, 25th, and 20th data points are added together in the next adder 15; and so forth. The outputs of each adder 15 are applied as the inputs to the FFT signal processor 17, as shown. Accordingly, there are four input values which are processed from a data stream of 32 sample points. As will be understood, different block data lengths L and N lengths can be processed in accordance with the discussion above. If the FFT 17 had a different number of inputs, then the data stream would be separated accordingly and the number of adders would be adjusted.

Figure 2:
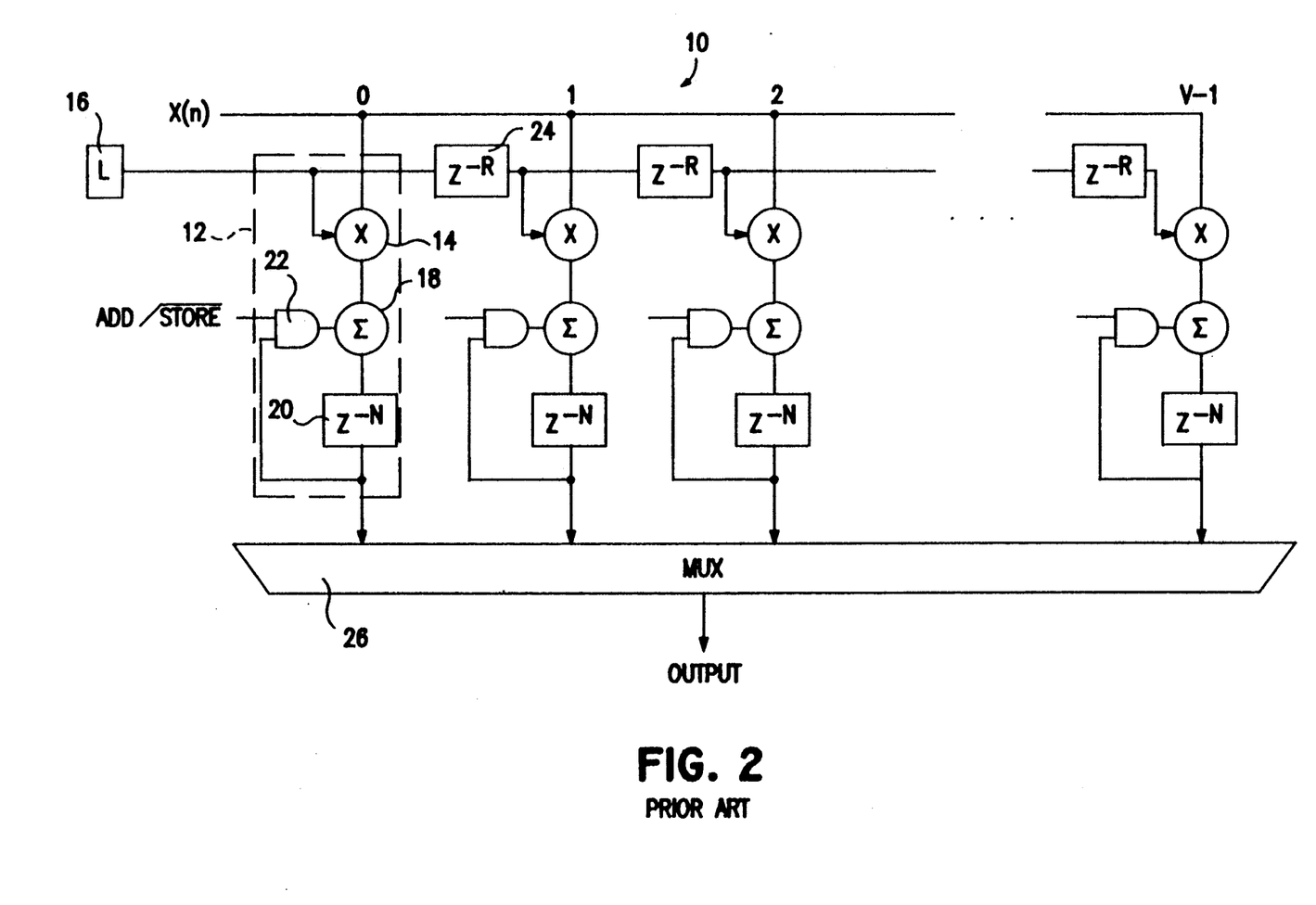
FIGS. 2, 3 and 4 are block diagram representations of three conventional prior art window/presum operational architectures.
Figure 3:
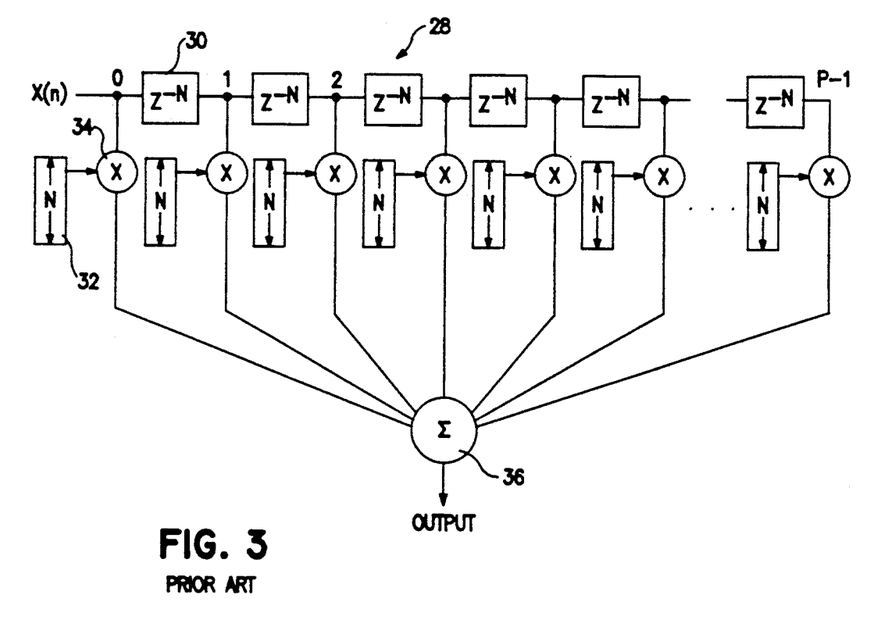
Figure 4:
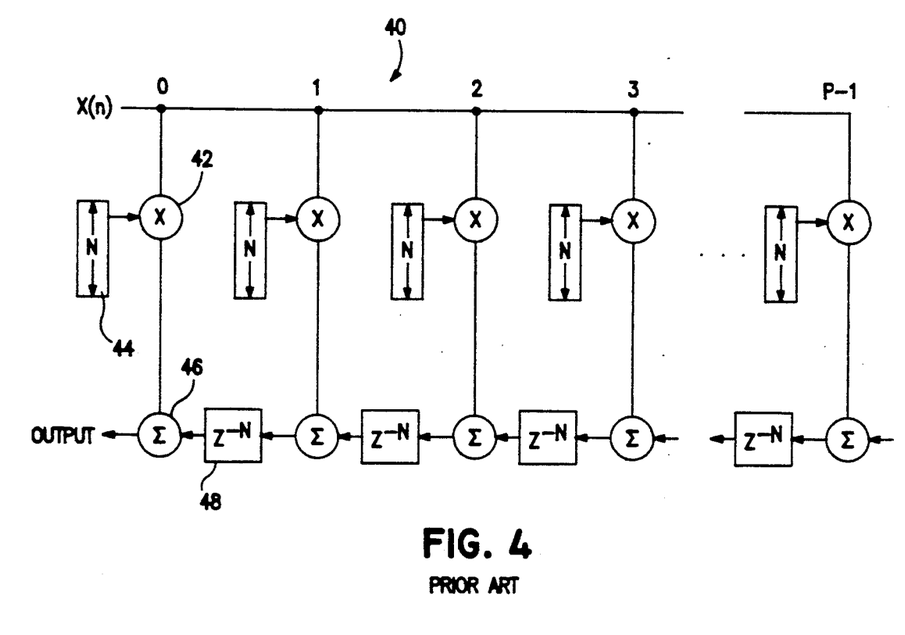

This is the basic operation of windowing and presumming which would be performed on a predetermined window length L for applying a predetermined number of inputs to a single FFT processor. Clearly, the amount of hardware is excessive. Consequently, designers of these types of systems seek to reduce these components in a usable format. Many different prior art methods are thus known which perform the window and presum operations. FIGS. 2-4 show, in block diagram form, three of the better known methods.

At this point it may be advantageous to define a few system parameters. As discussed above, L equals the window length of specific data sample points, and for the example above it has been set at L equal to 32. Further, N is equal to the number of input and output channels of the FFT processor and as such, is equal to the number of adders which will be used in the presumming operation of FIG. 1 since the output of the adders is applied to the input channels of the FFT processor.

For a processor of this type, it is known in the art to decimate the output signal. Decimation can be conceptually defined as saving each predetermined number of output data samples and discarding the rest of the sample points. A decimation factor R would represent saving every Rth sample point. In order to generate only the output samples which will be used, an output sample is computed once every R input clock cycles. In other words, as the data points are being shifted into shift register 11 of FIG. 1 one per every clock cycle, the windowing and presumming components only act on every set of data points in register 11 after a certain number of clock cycles as set forth by the factor R.

From this, an overlap ratio V is represented as L/R. The overlap ratio is conceptually defined as the total number of window locations in which any given data sample will have been a member of after passing through the system. Consequently, if R is equal to L there is no overlap. For our example, R is set equal to 4, the number of channels N, and thus the overlap ratio V is equal to L/R which equals 8. Also defined is a presum ratio P. The presum ratio is the number of individual groups of data which are included in a single window length L, i.e. L/N. Since N is equal to 4 in this example, the presum ratio will also be equal to 8.

Now turning to FIG. 2, a prior art window and presum operation is shown in a block diagram form as processor 10. A stream of digital data labeled X(n) is administered in serial form to a series of processing elements, one of which is outlined by a dotted box 12. For processor 10 there are V processing elements 12, and thus for the example above there would be eight (8) processing elements (PE) 12 labeled 0-7. Each processing element 12 receives the data stream simultaneously.

Each individual data sample X(n) is first applied as an input to a multiplier 14 along with an input from a read only memory (ROM) 16 which stores the predetermined coefficients. The multiplied output from multiplier 14 is applied as an input to an adder 18. Also applied to adder 18 as an input is an output from an array of AND gates 22 (one of which is shown). The output of adder 18 is applied to a delay memory 20 which delays the output from adder 18 for N clock cycles. The output of delay memory 20 is applied to a multiplexer 26 and also to a first input of AND gates 22. Multiplexer 26 receives all of the outputs from each processing element 12 and transfers them in an appropriate sequence to an FFT processor (not shown). The second input of AND gates 22 is an initializing input shown as an add/store input. This input is used to separate groups of data signals. A zero input from the add/store initializing input to AND gates 22 will give the output of AND gate 22 a zero such that the adder 18 will add a zero to the output of multiplier 14. The combination of adder 18, AND gates 22 and memory 20 acts as an accumulator with an "initialize" control input.

Processor 10 includes a series of processing elements 12 as described above. Each separate processing element 12 is administered the same data stream sample in a broadcasting manner, as is well known in the art. The coefficient from ROM 16 is applied to each multiplier 14 of each processing element 12 as shown. However, the coefficient from ROM 16 is applied through a delay memory 24 to each processing element 12 (except the first processing element) which delays the output to each separate multiplier 14 by a predetermined number of clock cycles. Consequently, each multiplier 14 of each separate processing element 12 receives a different coefficient for each separate data point.

In the design of FIG. 2, the parameters for each different operation is set out according to well known applications. Specifically, the number of coefficients for ROM 16 are set at the window length L. Each delay register 20 delays the output from adder 18 a number of clock cycles equal to the number of channels N of the FFT processor. Each of the delay memories 24, which delays the coefficient from ROM 16 a predetermined number of clock cycles before being applied to each multiplier 14 of each separate processing element, is delayed a number of clock cycles according to the decimation factor R. Both the values N and R are application specific, and thus, may change according to whatever specific application the signal processor was being used.

In the operation of processor 10, a data point will be inputted to multiplier 14 along with a coefficient L from ROM 16. The multiplication of these two values will be applied to adder 18 along with the output of delay memory 20 if the add/store input is set to one. Adder 18 accumulates the output of multiplier 14. Because of delay memory 20, adder 18 sums together every Nth data point multiplied by the desirable coefficient. For example, if N is equal to two (2), adder 18 will first sum together the first data point multiplied by the coefficient in ROM 16 and the output of AND gates 22 which would be zero assuming ADD/STORE was low for the first N points. As the clock cycles continue to N equal to two (2), the output of AND gates 22 will still be zero. Consequently, adder 18 will add together that data point, multiplied by the appropriate coefficient, at time two (2) plus zero. As the adder 18 continues to accumulate, the next value which will be added to zero plus two (2) will be the data value at time four (4). Consequently, adder 18 will add data points zero plus two (2) plus four (4) plus six (6) and so forth until the add/store input to AND gate 22 is reasserted to zero. Likewise, for a value of N equals two (2), adder 18 will add each data point, multiplied by the appropriate coefficient, of time one (1) plus three (3) plus five (5) and so forth. Accordingly, whatever the N value is, the processing element 12 will accumulate every Nth data point value together, and thus it will accumulate non-adjacent data points. By studying the operation of the processors depicted in FIGS. 1 and 2, it will become apparent that both perform the same function, but processor 10 utilizes less components and thus is a more efficient design. However, this design still suffers from all of the drawbacks discussed earlier.

As is apparent from the discussion above, each of the different processing elements 12 of processor 10 includes a multiplier 14, an adder 18, and two separate memories 20 and 24. By this type of design, it is necessary that each of the two memories 20 and 24 include their own input and output. Likewise, each individual multiplier and accumulator has its own input and output interfaces to the memories. Consequently, there is a large number of input and output requirements. As discussed above, modern ASICs have capabilities of incorporating a plurality of specialized functions on a single chip. However, there is a limit to the number of input and output ports a single ASIC can have. In addition, there are certain restraints on incorporating memory blocks within an ASIC. Therefore, for a design as shown in FIG. 2, it is necessary to have a multitude of separate ASICs and separate small banks of memory to accommodate the number of input and output ports which are required and remove the memory from the ASICs. In this type of format, much space and performance is wasted in each individual chip. Consequently, an increase in the number of chips increases the power requirements and decreases the reliability of the processor.

Other windowing and presumming operation designs fair no better than that of FIG. 2. Turning to FIG. 3, another prior art windowing and presum operation architecture 28 is shown in block diagram form. In this operation, the data stream X(n) would be the same as that of FIG. 2 as would the output to the FFT. Once again, a series of delay memories 30, which delay by the size N of the FFT, are applied to different multipliers 34. Also, a coefficient from different ROMs 32 are also applied to the individual multipliers 34, as with FIG. 2. Here, however, instead of one coefficient memory there is a coefficient memory for each different processing element. The output from each different multiplier 34 is applied to a single accumulator 36. Once again, it becomes apparent that there is an excessive number of input and output ports which are required for the different memories 30 and 32. Consequently, as with FIG. 2, a limited number of operations can be included on a single ASIC. Note, this architecture assumes R=N. FIG. 4 shows a third prior art windowing and presumming operation architecture 40 substantially similar to both FIGS. 2 and 3. In FIG. 4, the same data bit stream X(n) is administered to a series of processing elements shown in block diagram form. Each processing element includes a multiplier 42 which receives the data input stream and an input from a ROM 44 storing the coefficients. The output of the multipliers are applied to an adder 46 along with an output from a delay memory 48, as shown. Once again, it is apparent that a multitude of separate memories are required which will, once again, raise the chip level.

This invention limits the number of memory chips and ASICs which are required to perform the above windowing and presumming operations. To do this, a well known technique referred to as corner turning is utilized to reorder the data stream X(n). Conceptually, corner turning involves writing a sequence of data into a matrix beginning with the top left location and writing digital data points into the matrix from left to right and row to row. Once the matrix is full, the data points are read-out in a different order starting with the same upper left position, but reading from top to bottom and column to column. This technique reorders the data which will ultimately enable the processor to presum the data by adding together adjacent data points of either current data or next data, as will be described below. By reordering the data in this manner, it is possible to include large banks of memory up front before the multiplication and addition processes, thus limiting the number of inputs required to the different ASICs.

Figure 5A:
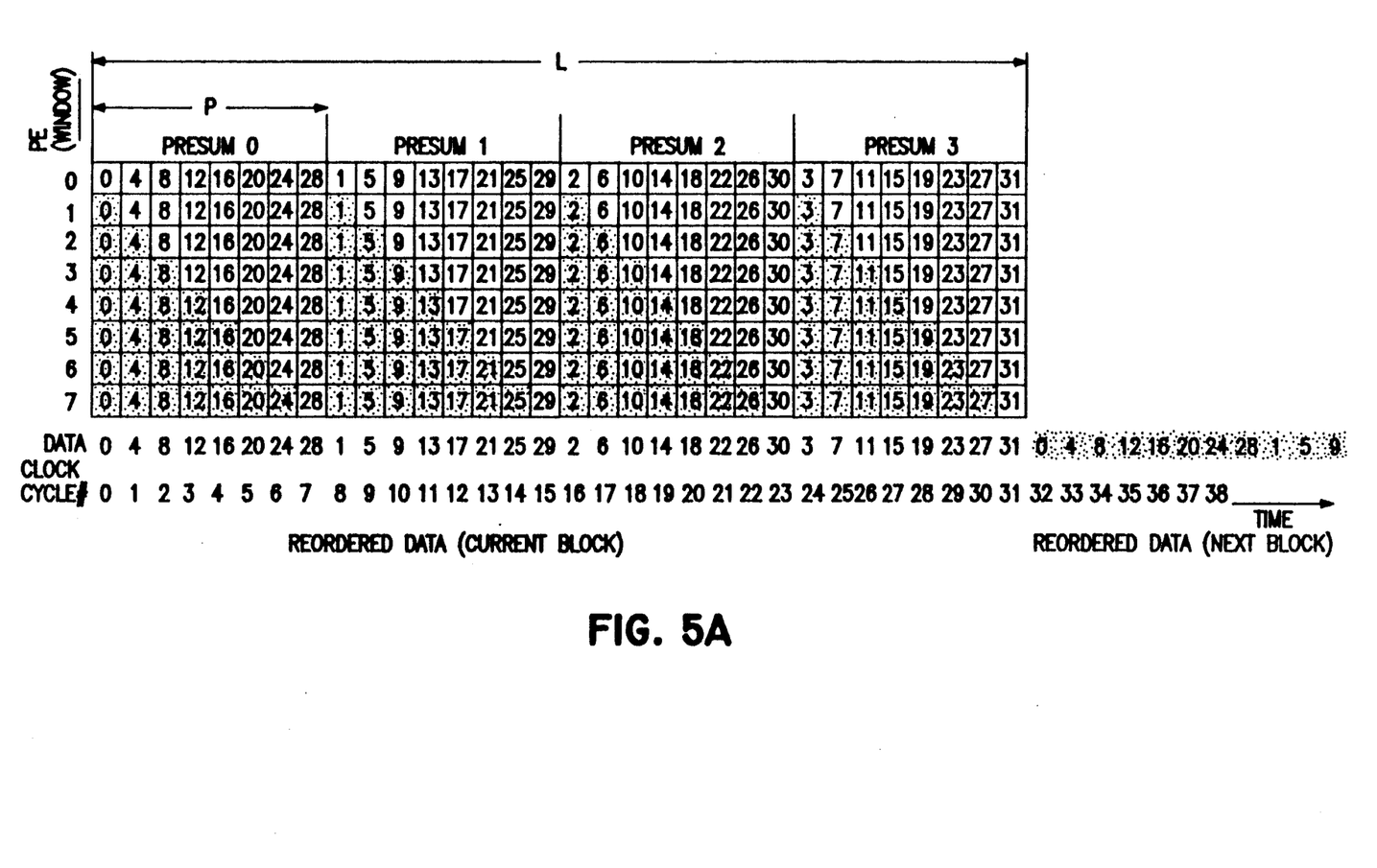
FIGS. 5(A) and 5(B) are timing charts showing data positions for windowing and presumming operations according to one preferred embodiment of the present invention.
Figure 5B:
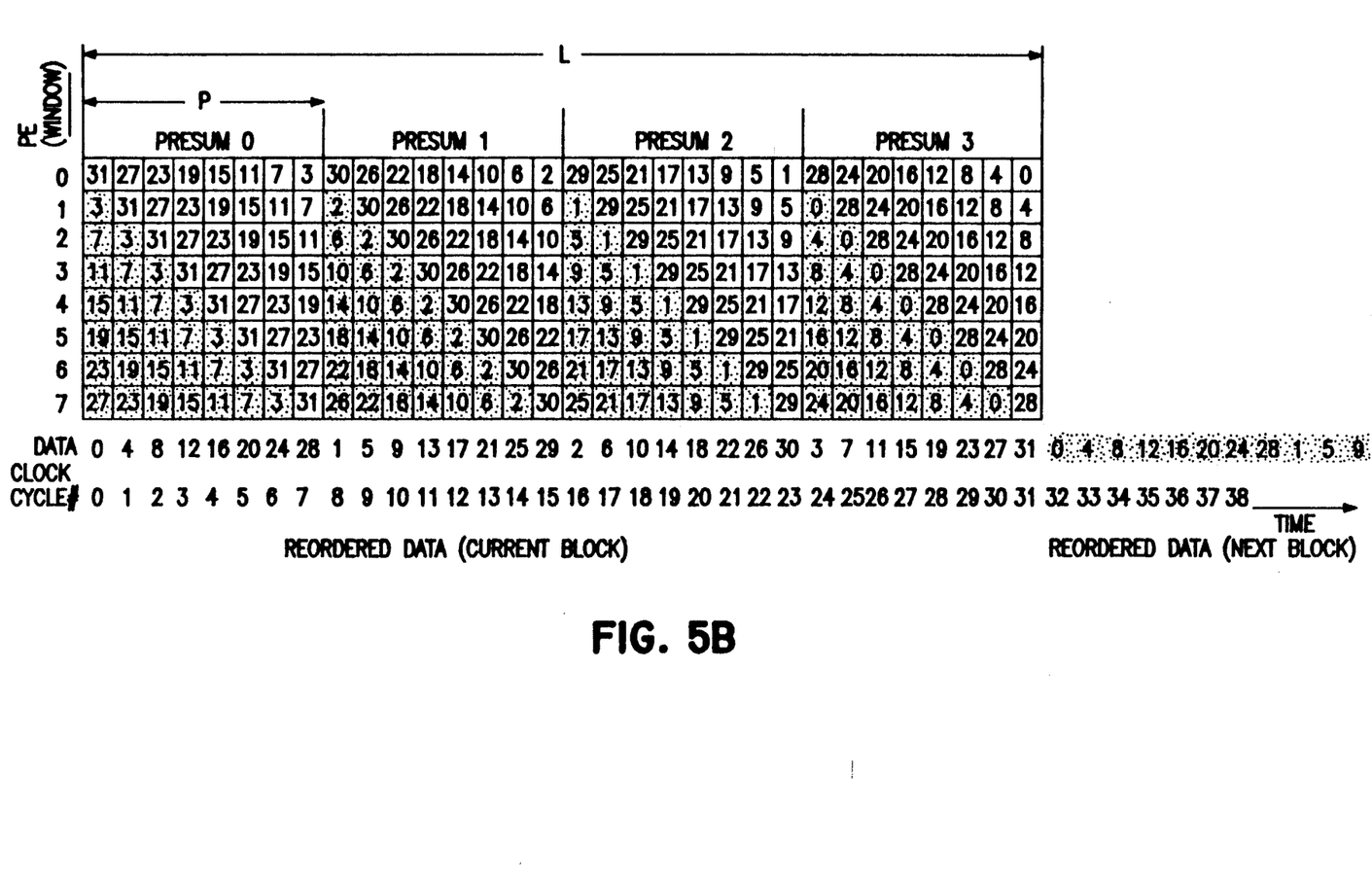
Figure 6:
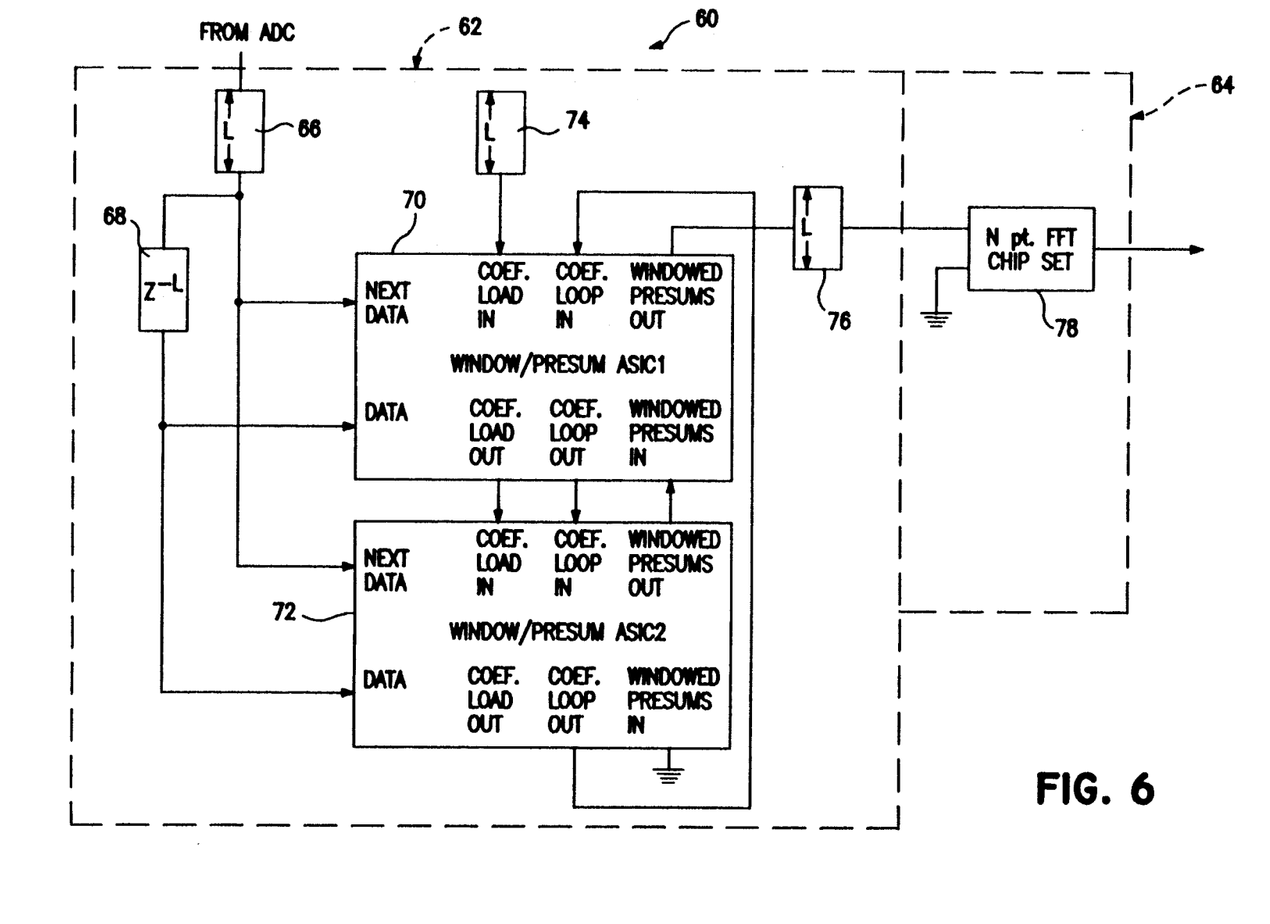
FIG. 6 is a fast window/presum architecture, according to a first preferred embodiment of the present invention, and includes a generic FFT processor in the block diagram.
Figure 7:
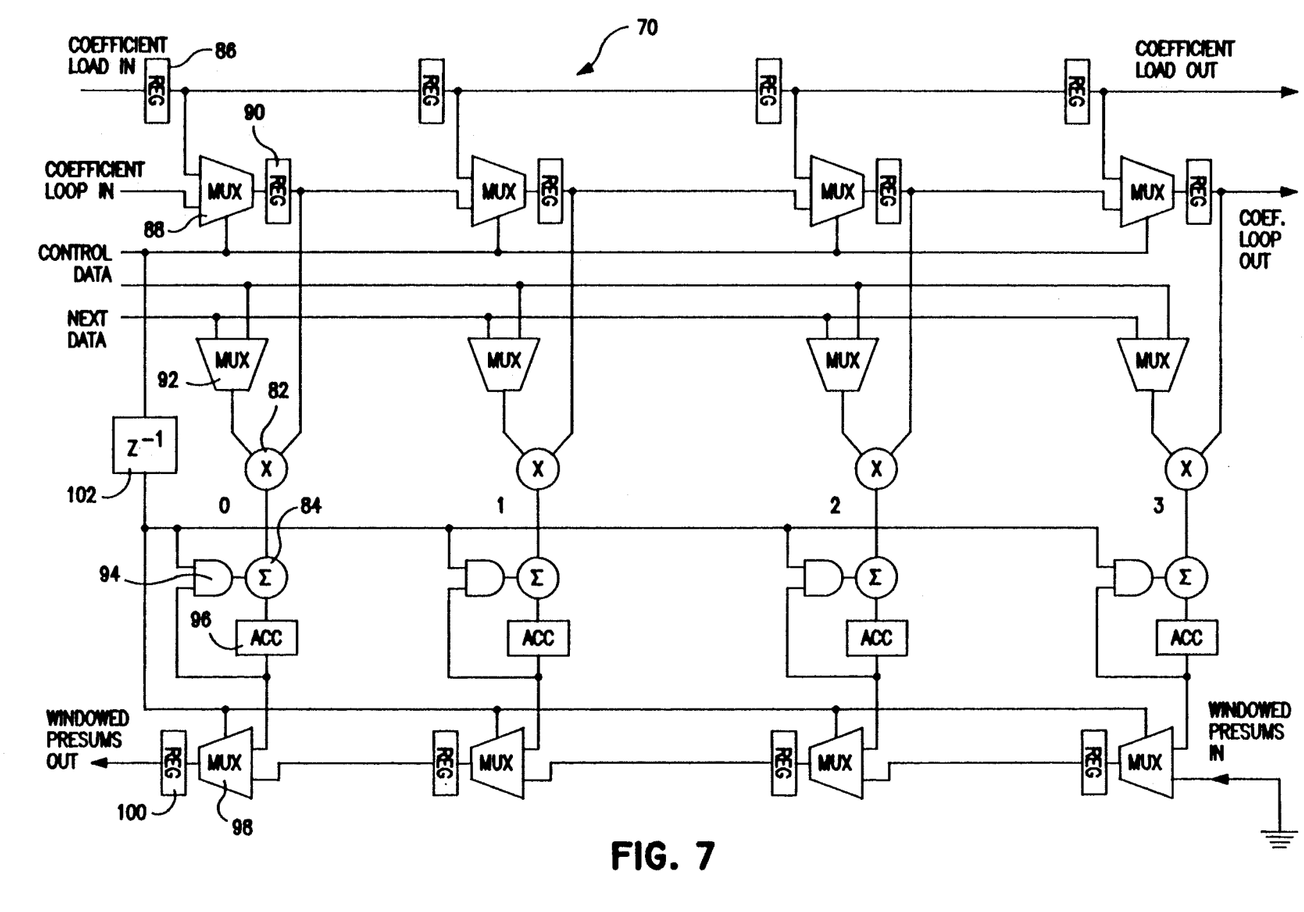
FIG. 7 is a detailed block diagram of one ASIC of the fast window/presum architecture of FIG. 6.

FIGS. 5A and 5B are the essence of the invention. Once they are understood, the architecture of FIGS. 6 and 7 presents itself.

First turn to FIG. 5A. FIG. 5A is merely an example having the same parameters as for the discussion of FIG. 1. The data line at the bottom of FIG. 5A represents a string of data points shown in the order that they would emerge from a corner turning buffer. The number 0 on this line represents the first point in the original (before corner turning) data block; 1 represents the second point; 2 the third; . . . ; 31 the last. The shaded values on the data line following the unshaded ones represent the beginning of the next block of reordered data points. Note that the numbering begins again at zero and is thus relative within a block. This will be useful below where it is important to be able to easily identify data samples which occupy the same relative location in different blocks. Also note that each block of data is reordered in an identical fashion.

For a processor of N equal to 4, as in the example, the reordering results in each 4th data point being adjacent to each other as compared with the original stream of data. This will facilitate the presumming operation.

Each row in the matrix of FIG. 5A represents a separate timing diagram. There are V (the overlap ratio) rows and each is associated with a particular Processing element (PE) in the processor.

The entry in a particular square of the matrix indicates the data sample that a particular PE (row) will operate on at a particular time (column). Note that, at any given time, all of the PEs will use either one of two data points: either the data point in the current block (unshaded) shown on the data line below the column or the data point from the same relative location in the next (shaded) block. For example, during clock cycle 12, processing elements 0-4 will operate on data sample 17 from the current (unshaded) block while processing elements 5-7 will operate on data sample 17 from the next (shaded) block.

To relate the new processor to the operations of FIG. 1, observe the following. As shown, shift register 11 in FIG. 1 contains all the data in the current block and no data from the next block. Thus, the window and presum operations for that configuration operate only on data from the current block. PE 0 of FIG. 5A corresponds to this case (note that the PE 0 row in FIG. 5A has no shaded entries). Recall that after calculating a set of output samples, R new data points are shifted into shift register 11 of FIG. 1 and R old samples are shifted out before a new round of operations begin. Thus, in this example, after completing the first set of operations, data points 0-3 from the current block will be shifted out of the shift register while data points 0-3 from the next block will be shifted in and then a new set of computations will be performed. PE 1 in FIG. 5A corresponds to the configuration after the shift. Note that in FIG. 5A the matrix entries for PE 1 differ from those of PE 0 in exactly the fashion described above. Namely, data points 0-3 of the current block have been omitted and points 0-3 of the next block have been included. This pattern is repeated. That is, moving down a row in FIG. 5A, results in 4 data points from the current block being replaced with 4 data points from the next block.

It is clear from the above and FIG. 5A that, collectively, the PEs of the new design will require only two data points per clock cycle. For example, during cycle 5, data sample 20 from the current block and sample 20 from the next block are required. It is largely due to this feature that the new design avoids the I/O problems associated with prior methods. Also, note that the data samples which need to be added together in the presum operation are always adjacent to one another. This is true for all of the PEs. This feature is responsible for reducing the accumulator memories of the prior art to accumulator registers in the new design.

In the above description, attention was paid to the time and order in which data samples would be presented to each PE in the design. Now consider the windowing operation and recall that every data point will be multiplied by an appropriate coefficient. FIG. 5B is similar to FIG. 5A, except that the entries in each box no longer represent the data points required by each PE during a particular clock cycle but instead the coefficient that is required. The shading of FIG. 5A is retained in 5B only for convenience because current and next blocks are not relevant to coefficients.

By analyzing each of the different points relative to the other ones in FIG. 5B, it becomes apparent that each column of coefficients shifts down one space with the bottom row of coefficients going to the top row (circular shift). This implies that the PEs of the new design do not require delay memories between one another for the purpose of delaying coefficients. Instead, such delay memories of the prior methods are replaced by registers in the new design.

This concept is implemented as shown in block diagram form in FIG. 6. FIG. 6 includes a processor 60 having a window/presum front end section 62 and an FFT section 64. The reordering of the data enables two large banks of memory 66 and 68 to store data into a current data block of L and a next data block of L. More particularly, an input corner turning buffer memory 66 receives the X(n) signal from an analog-to-digital converter (not shown). The output of buffer memory 66 goes to a delay buffer 68 implementing a delay of the window length L. The output from each of the buffers 66 and 68 are applied as next data and current data, respectively, to two separate ASICs 70 and 72, both of which perform the same functions. Both ASICs 70 and 72 include a specialized arrangement of multipliers, accumulators, multiplexers, and registers to perform the window and presumming operations as discussed above to give a desirable output (see FIG. 7). Note, a coefficient ROM 74 is applied to ASIC 70 (which in turn feeds ASIC 72) to provide the desirable coefficients for the windowing operation. Once the coefficients are applied to the ASICs, a coefficient loop keeps the coefficients cycling in a looping fashion as required by the discussion above (FIG. 5(b)). The output from ASICs 70 and 72 are first applied to an intermediate reordering random access memory (RAM) 76 to reorder the data to an order suitable for input to an FFT processor. The reordering is corner turning. The output of RAM 76 is applied to an FFT 78.

FIG. 7 is a block diagram of the components of ASIC 70 with the understanding that ASIC 72 is identical. As is apparent, ASIC 70 includes four (4) processing elements similar to that of FIG. 1, including multipliers 82 and adders 84. Each processing element 0-3 further includes a first register 86, a first multiplexer 88, a second register 90, a second multiplexer 92, an array of AND gates 94, a single accumulator register 96, a third multiplexer 98 and a third register 100 arranged as shown. Specifically, first register 86 is connected to an adjoining register 86 and as a first input to first multiplexer 88. A second input of multiplexer 88 is applied from an end register 90 of the coefficient loop. The output of multiplexer 88 is applied to the second register 90 whose output is applied to multiplier 82. A second input to multiplier 82 is from second multiplexer 92. Multiplexer 92 receives two input signals along the current data and next data lines. The output of multiplier 82 is applied to adder 84 which also receives an input from AND gate 94. The output of adder 84 is applied to a single accumulator register 96. The combination of adder 84, AND gate 94, and accumulator register 96 make up an accumulating network. The output of accumulator register 96 is applied to a third multiplexer 98 and also to one input of AND gate 94. In practice, AND gate 94 will be part of an array of AND gates in each processing element to accommodate the number of bits in a sequence being output from accumulator register 96. The second input of AND gate 94 is received from a delay register 102. The output of the third multiplexer 98 is applied to register 100. A control data line controls the operation of ASIC 70.

In operation, registers 86 are loaded with an appropriate coefficient from coefficient ROM 74 for a desirable windowing operation. The outputs from registers 86 are applied to multiplexers 88. When multiplexer 88 receives an appropriate signal from the control line, the coefficients from registers 86 are loaded into registers 90 for each processing element. During the windowing operation, coefficients in each register 90 are transferred to an adjacent register 90 to the right of it once per every clock cycle. The end register 90 on the right is looped around and applied to the first register 90. The coefficients in each register 90 are applied to each multiplier 82 as an input. Also applied to each multiplier 82 as an input is a next data point from corner turning buffer 66 or current data from buffer 68. The control line determines which of these inputs will be applied to multiplier 82 through multiplexer 92. The output of multiplier 82 is applied to adder 84, as with the conventional operation of FIG. 2. Further along the lines of the operation of FIG. 2, an AND gate 94 applied to an adder 84 as a input for initialization of accumulator register 96.

Since the data has been reordered in an appropriate manner such that adjacent inputs of current data or next data are being added, accumulator register 96 replaces the delay memory 20 of FIG. 2. Since register 96 is a one position register, it does not act as a RAM and thus can be readily implemented on an ASIC. An output from accumulator register 96 is applied as an input to AND gate 94. As above, AND gate 94 acts as an initializer to adder 84 through a register 102 having an input from the control line. The output of accumulator register 96 is applied to multiplexer 98 which has an output applied to register 100. A signal from the control line through register 102 determines which input to the multiplexer 98 is applied to the output line. The far right multiplexer 98 receives an input from other output multiplexers from other ASICs, such as ASIC 72, if appropriate. For ASIC 72, the far right multiplexer 98 would be the end of the line and as such would be connected to ground.

As is apparent from the above description, the windowing and presumming operations can be performed on a data stream by efficiently using high density blocks of memory and full ASIC capability. Since the architecture of the preferred embodiment of the present invention is designed to use a number of input and output ports for each ASIC within the capabilities of the technology, it is possible to fit as many operations as possible on each ASIC. Therefore, for specific applications single ASICs may be applicable. Further, as the technological capabilities of an ASIC chip increases, more and more processing elements can be incorporated in a single ASIC. Consequently, the size, weight, power and cost of a specific processing system will be reduced and the reliability will be increased due to a fewer number of chips.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of signal processing comprising the steps of:
    applying a stream of digital data bits to a corner turning buffer in order to corner turn the stream of data bits;
    applying the corner turned data stream from the corner turning buffer as next data to an input of a delay buffer and to a specialized integrated chip;
    applying output data from the delay buffer as current data to the specialized integrated chip;
    selecting either the current data from the delay buffer or the next data from the corner turning buffer on a processing element by processing element basis in each of a series of processing elements, said series of processing elements being associated with the specialized integrated chip, and multiplying the selected data by a predetermined coefficient in a multiplier in each processing element;
    applying an output of each multiplier to an accumulator in each processing element for accumulating the multiplied output with a previous accumulated output from the multipliers; and
    applying an output from the accumulators to subsequent processing devices.

2. The method according to claim 1 wherein the step of multiplying by a coefficient in the multipliers includes loading the coefficient from a read only memory separate from the specialized integrated chip into a first register which is part of a series of first registers arranged in a chain configuration such that after a clock cycle the coefficient in one register is transferred to an adjoining register.

3. The method according to claim 2 wherein the step of multiplying by a coefficient includes loading the coefficient into a second register from a first register, the second register being part of a series of second registers arranged in a loop configuration.

4. The method according to claim 1 wherein the step of applying the output of each multiplier to an accumulator includes the steps of applying the output of the multipliers to an adder along with the output from at least one AND gate in each processing element, wherein the at least one AND gate has an input from a control line and an input from a single step accumulator register, the accumulator registers having an input from the adders such that the accumulator registers accumulate consecutive data outputs from the multipliers until a signal from the control line to the at least one AND gate reinitializes the accumulators.

5. The method according to claim 4 wherein the step of applying the output of the adders to an accumulator register includes applying the output of the single step accumulator registers to a series of multiplexers which selects from a plurality of outputs the output of the signal processor.

6. The method according to claim 5 further including the step of applying the output of the specialized integrated chip to an intermediate reordering random access memory for reordering the data to a predetermined form suitable for a fast fourier transform processing chip.

7. An apparatus for performing windowing and presumming operations comprising:
corner turning buffer means for accepting a stream of digital data and reordering the digital data by the operation of corner turning, said corner turning buffer means further storing the corner turned data as next data and outputting the data as next data;
delay buffer means for accepting the corner turned data from the corner turning buffer means, said delay buffer means storing the corner turned data as current data and outputting the data as current data; and
a specialized integrated chip means for accepting as inputs the next data from said corner turning buffer means and the current data from said delay buffer means, said integrated specialized chip means performing the windowing and presumming operations making use of both the current data and the next data input signals, and providing an output of the windowing and presumming operations.

8. The apparatus according to claim 7 wherein said specialized integrated chip means includes a series of multipliers, each of said multipliers accepting as an input one of either the current data or the next data and a coefficient, said multipliers multiplying the current data or the next data and the coefficient.

9. The apparatus according to claim 8 further comprising coefficient memory means for storing predetermined coefficients, wherein the coefficients applied to each multiplier are selected from the coefficient memory means, said coefficient memory means outputting a series of coefficients to a series of registers connected in a loop configuration wherein the coefficient applied to one register of the series is transferred to an adjacent register of the series in the loop once per every clock cycle and the last register in the loop transfers its coefficient to the first register in the loop.

10. The apparatus according to claim 8 wherein an output from each of the multipliers is applied as a first input to a series of adder means, each of said adder means accumulating consecutive outputs from the multipliers.

11. The apparatus according to claim 10 wherein an output of each of the adder means is applied to a single step accumulator register such that an output of the accumulator registers is applied as a second input to the adder means.

12. The apparatus according to claim 11 wherein the output of each of said accumulator registers is applied as a first input to a series of AND gates, said AND gates having an output connected to each of the adder means and also accepting a second input from a control line such that upon an appropriate signal from the control line said AND gates will reinitialize said adder means.

13. The apparatus according to claim 12 wherein the output of each accumulator register is applied to a multiplexer, each of said multiplexers being a part of a series of multiplexers for selecting an appropriate output for the specialized integrated chip means.

14. The apparatus according to claim 7 wherein an output of the specialized integrated chip means is applied to an intermediate reordering random access memory, said intermediate reordering random access memory reordering the corner turn data to a form suitable for subsequent fast fourier transform (FFT) processing.

15. The apparatus according to claim 14 wherein the output of the intermediate reordering random access memory is applied as an input to a specialized signal processor FFT.

16. A method for performing windowing and presumming operations comprising the steps of:
applying a stream of digital data bits to a reordering buffer in order to reorder the stream of data bits;
applying the reordered data bit stream from the reordering buffer to an input of a delay buffer and to a specialized integrated chip as next data;
applying output data from the delay buffer to the specialized integrated chip as current data; and
selecting either the current data from the delay buffer or the next data from the reordering buffer on a processing element by processing element basis in a series of processing elements, said processing elements being associated with the specialized integrated chip, and multiplying it by a predetermined coefficient in a multiplier device in each processing element.

17. The method according to claim 16 further including the step of applying an output of the multiplier in each processing element to an accumulator for accumulating the multiplied output with a previously accumulated output from each multiplier.

18. The method according to claim 17 wherein the step of applying the output of the multipliers to an accumulator includes the steps of applying the outputs of the multipliers to an adder along with an output from at least one AND gate in each processing element, wherein the at least one AND gate has an input from a control line and an input from a single step accumulator register, said single step accumulator register having an input from the adders such that the accumulator register accumulates consecutive data outputs from the multipliers until a signal from the control line to the at least one AND gate reinitializes the accumulator.

19. The method according to claim 16 wherein the step of multiplying by a coefficient includes loading the coefficient from a read only memory separate from the specialized integrated chip into a first register which is a part of a series of first registers arranged in a chain configuration such that after a clock cycle the coefficient in one register is transferred to an adjoining register.

20. The method according to claim 19 wherein the step of multiplying by a coefficient includes loading the coefficient into a second register from a first register, the second register being part of a series of second registers arranged in a loop configuration.

21. The method according to claim 16 wherein the step of applying the stream of digital data bits to a reordering buffer includes applying the stream of digital data bits to a reordering buffer in order to corner turn the stream of data.

22. The method according to claim 16 further including the step of applying the output of the specialized integrated chip to an intermediate reordering random access memory for reordering the data to its original form before being reordered by their reordering buffer.

* * * * *